March 26, 1946.  T. S. SCRIBNER  2,397,296
DETACHABLE WHEEL MOUNT
Filed March 31, 1945
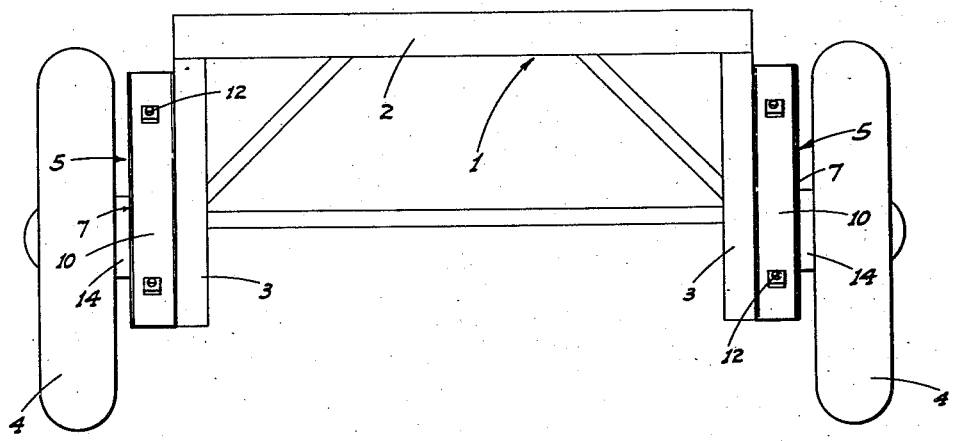
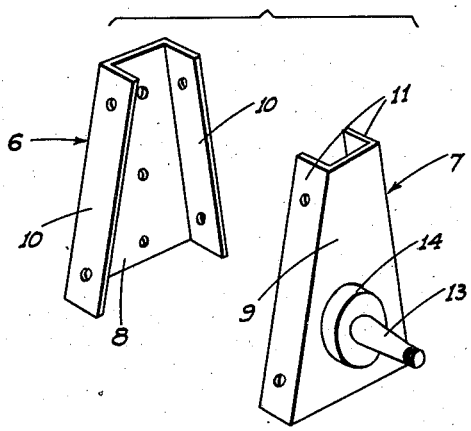
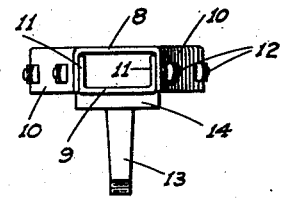
INVENTOR.
T. S. Scribner
BY
ATTYS Patented Mar. 26, 1946

2,397,296

UNITED STATES PATENT OFFICE 2,397,296

DETACHABLE WHEEL MOUNT

Thornton S. Scribner, Nevada City, Calif.

Application March 31, 1945, Serial No. 585,849

5 Claims. (Cl. 280—80)

This invention relates in general to an improved wheel mount for vehicles, and especially trailers used for agricultural and industrial purposes.

One object of the present invention is to provide a novel detachable wheel mount arranged so that wheels, particularly of pneumatic-tired type, may be readily mounted in connection with or removed from a vehicle, as for example farm wagons, industrial trailers, or the like.

Another object of the invention is to provide a detachable wheel mount which comprises, for each wheel, a pair of complementary members adapted to be rigidly but separably connected together, one member being arranged for mounting on the vehicle, and the other member supporting a wheel assembly. With such an arrangement, one set of wheels, with the corresponding members, may be used selectively in connection with a plurality of vehicles; this being accomplished by merely mounting complementary members on said vehicles. A farmer, for example, can thus employ one set of rubber-tired wheels for use with a number of farm vehicles, such as wagons, etc.

A further object of the invention is to provide a detachable wheel mount comprising a pair of complementary bracket units normally but separably secured together, one unit adapted to be mounted on the vehicle and the other unit supporting a wheel assembly, said bracket units being upwardly tapered and flanged so that said other unit normally engages said one unit in upwardly wedging relation.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawing similar characters of reference indicate corresponding parts in the several views:

Figure 1 is an end view of a vehicle supported on opposite sides by detachable wheel mounts embodying the present invention.

Figure 2 is a perspective view of the wheel mount detached from the vehicle and with the bracket units separated.

Figure 3 is a plan view of the wheel mount assembly, but detached from the vehicle.

Referring now more particularly to the characters of reference on the drawing, the numeral 1 indicates generally a wheel-supported vehicle, as for example a farm wagon or trailer. The vehicle 1 includes a bed 2 and, on opposite sides, rigid depending side members 3. The vehicle 1 is supported on opposite sides by rubber-tired wheels 4 secured in connection with the side members 3 by means of detachable wheel mounts 5. These wheel mounts comprise the essence of the present invention and each is constructed as follows:

Each wheel mount 5 comprises an inner and outer bracket unit, indicated at 6 and 7, respectively. The bracket units 6 and 7 each include a vertical plate, indicated at 8 and 9, respectively, said plates being flat-sided and tapering upwardly.

The plate 8 is formed, along opposite edges, with outwardly projecting flanges 10 which, due to the taper of the plate 8, converge upwardly. The plate 9 is symmetrical to the plate 8 and is formed, along opposite sides thereof, with inwardly projecting flanges 11.

The outer bracket unit 7 is adapted to engage in the inner bracket unit 6 from below, with the flanges 10 lapping the flanges 11. By this arrangement the outer bracket unit 7 upwardly wedgingly engages the inner bracket unit 6; said bracket units being detachably connected together by cross bolts 12 which pass through matching openings in said flanges.

The outer bracket unit 7 is fitted, intermediate its ends, with an outwardly projecting spindle 13, secured to said plate by a suitable attachment disc or head 14. The corresponding wheel 4 is turnably mounted on the spindle 13.

The described detachable wheel mount is secured to the vehicle 1 by affixing the plate 8 in upstanding relation on the outside of one of the depending side members 3 of the vehicle.

By reason of my improved detachable wheel mount, the wheels 4 can be removed from the vehicle by merely taking out the cross bolts 12, whereby said wheels, together with the outer bracket units, are detached.

It will be seen that with a number of vehicles provided with inner bracket units 6, a single set of wheels may thus be used selectively with said vehicles, as may be desired. This is especially advantageous for agricultural use, wherein a number of vehicles are used only seasonally, remaining idle the rest of the time.

While I have described my invention as being intended for agricultural and industrial uses, it will be recognized that such invention may be otherwise effectively employed.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A detachable wheel mount comprising a pair of complementary bracket units, said bracket units each including an upstanding plate, said plates being disposed in adjacent but spaced facing relation, one of said plates being adapted to be mounted on a vehicle, a wheel supporting spindle projecting outwardly from the other plate, a pair of facing, upwardly converging side flanges on each plate projecting toward and lapping the flanges of the opposite plate, the flanges of said other plate engaging beneath the flanges of said one plate, and means detachably connecting said flanges.

2. A detachable wheel mount comprising a pair of upwardly tapering plates disposed in adjacent but spaced facing relation, one of said plates being adapted to be mounted on a vehicle, a wheel supporting spindle projecting outwardly from the other plate, a pair of facing, upwardly converging side flanges on each plate projecting toward and lapping the flanges of the opposite plate in symmetrical relation, the flanges of said other plate engaging beneath the flanges of said one plate, and means detachably connecting said flanges.

3. A detachable wheel mount comprising a pair of upstanding plates disposed in adjacent but spaced facing relation, one of said plates being adapted to be mounted on a vehicle, a wheel supporting spindle projecting outwardly from the other plate, a pair of facing, upwardly converging side flanges on each plate projecting toward and lapping the flanges of the opposite plate in symmetrical relation, the flanges of said other plate engaging beneath the flanges of said one plate, and means detachably connecting said flanges, said means comprising cross bolts extending through matching openings in said lapping flanges.

4. A detachable wheel mount comprising a pair of initially separate bracket units, one unit being provided with means for mounting it on a vehicle, the other bracket unit upwardly wedgingly engaging said one bracket unit, means detachably connecting the bracket units together, and a wheel supporting spindle projecting outwardly from said other bracket unit, said bracket units each including facing, upwardly converging flanges, the flanges of one unit being overlapped by the flanges of the other unit.

5. A detachable wheel mount comprising a pair of initially separate bracket units, one unit being provided with means for mounting it on a vehicle, the other bracket unit upwardly wedgingly engaging said one bracket unit, means detachably connecting the bracket units together, and a wheel supporting spindle projecting outwardly from said other bracket unit, said bracket units each including facing, upwardly converging flanges, the flanges of one unit being overlapped by the flanges of the other unit, said connecting means including cross bolts connecting corresponding engaged flanges.

THORNTON S. SCRIBNER.